United States Patent Office 3,312,762
Patented Apr. 4, 1967

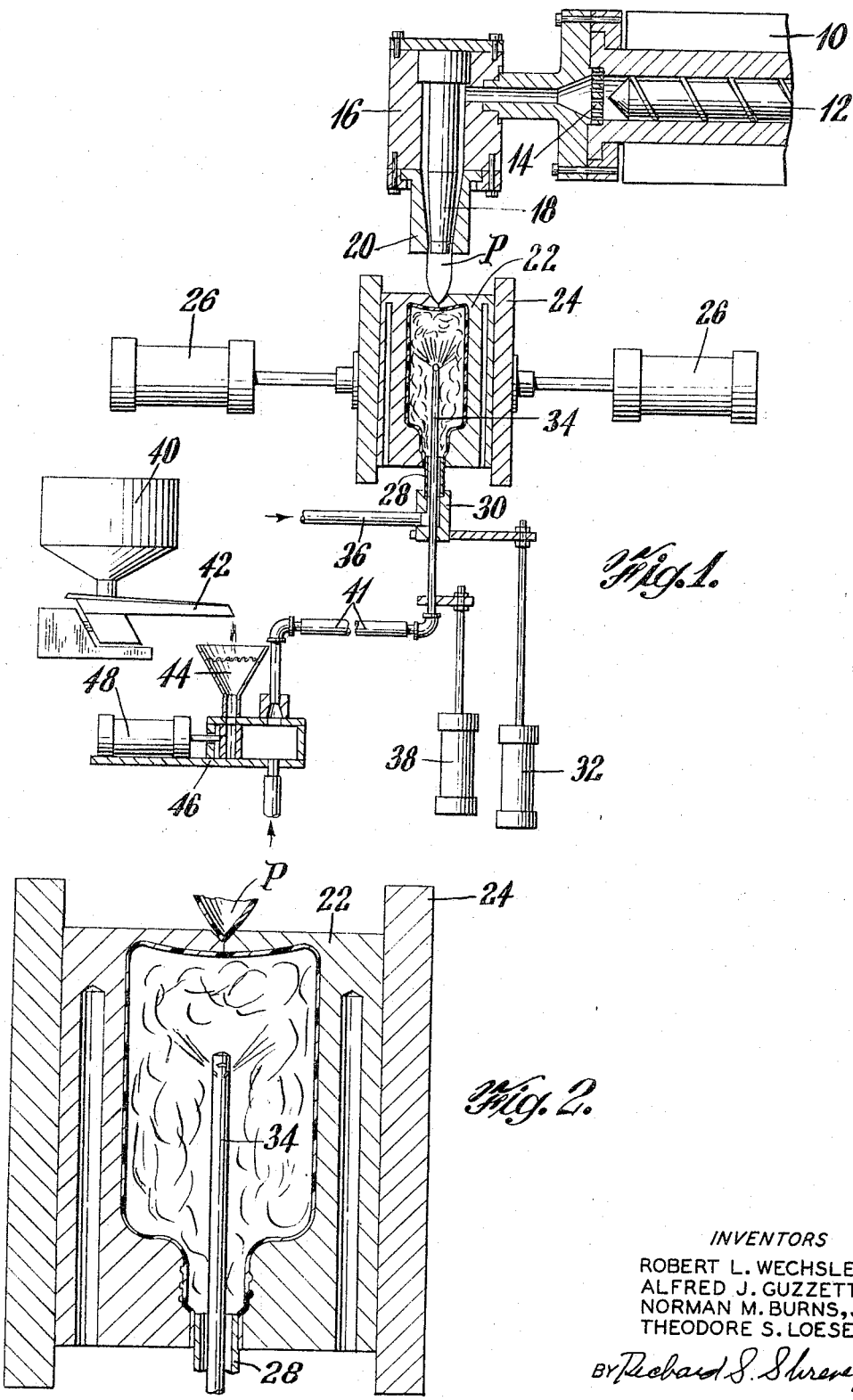

3,312,762
INSIDE COATING DURING BLOW MOLDING
Robert L. Wechsler, Somerville, Alfred J. Guzzetti, Westfield, Norman M. Burns, Jr., Plainfield, and Theodore S. Loeser, Nixon, N.J., assignors to Union Carbide Corporation, a corporation of New York
Filed Nov. 12, 1963, Ser. No. 322,962
2 Claims. (Cl. 264—98)

This invention relates to inside coating during blow molding.

There are many products which cannot be packaged in blow molded polyethylene containers because these products permeate readily through the walls of the container. Essential oils, liquid hydrocarbon, organic esters, ketones, various gases and vapors (particularly oxygen) are typical of the materials which cannot be packaged in polyethylene because they readily and rapidly permeate through the container walls.

Polyethylene blow molded containers can be coated internally with a barrier coating to make them permeation resistant and therefore suitable for containing these hard to hold materials. Today blow molded bottles are being coated commercially using a spray coating operation subsequent to the molding of the container. This method of coating is quite expensive.

The main object of the present invention is therefore to provide a low cost in line coating process, to carry out the coating process almost simultaneously with the blow molding operation and do away with the many expensive operations necessary to the bottle coating process in use today.

Another object is to provide a suitable barrier coating material, and to improve the permeation resistance of the polyethylene container.

According to the present invention, the in line coating process for blow molded containers is a technique for increasing the permeation resistance of a blow molded container whereby a barrier coating is applied simultaneously with the forming of the container. The in line coating process is carried out in a modified conventional blow molding machine in order to utilize the heat, 350 to 450° F., stored in the polyethylene just prior to the blowing operation. The process heat is used to advantage to promote adhesion between the coating material and the polyethylene resin, and aid in handling the coating system—initiate flow; cause gelation; and begin the cure of the coating.

The type of coating employed is not critical to the present invention. Any coating adapted to be sprayed onto a plastic surface to form a suitable permeation-resistant coating can be employed, including epoxy resins, particularly epoxy resin powders.

Performing the coating operation simultaneously with the blow molding operation provides another valuable advantage—more efficient utilization of the existing blow molding cycle time by performing two operations instead of only one. The application of the coating to the hot polyethylene also causes the polyethylene to cool more rapidly making it possible to shorten the overall cycle in some cases.

It is possible through the use of the in line coating process to manufacture a blow molded bottle complete with the barrier coating in approximately the same time as is required to produce an uncoated bottle by conventional means. In line coating offers the economic advantage of not requiring any subsequent coating operations with the exception of an oven cure. It is understood that the standard bottle neck finish operations are required.

Preferably, polyethylene resin modifiers, such as maleic anhydride, 1–2% compounded directly into the resin are used to promote coating adhesion. While this may be thought to be a disadvantage, these resin modifiers appear to function to promote adhesion only when the polyethylene is hot—above the softening point of the polyethylene making the key to their use and success the in line coating process.

In the drawings:

FIGURE 1 is a diagram of the arrangement of equipment necessary to carry out the in line coating process with powdered coating systems in its preferred form; and FIGURE 2 is an enlarged cross sectional view of the closed bottle molds, the blow stick complete with the blowing air port, and the vent port and the powder spray gun.

As shown in FIGURE 1, the equipment consists of a conventional extruder fed blow molding machine complete with a parison crosshead; pin and die set-up; molds; mold clamp mechanism and blow stick.

The extruder 10 is of conventional construction, including an extruder screw 12 and a breaker plate 14 which delivers the material to a parison crosshead 16 provided with a pin 18 and a die 20. The molding apparatus comprises bottle molds 22, and molds plate 24 actuated by mold clamp cylinders 26.

The blow stick 28 is carried by a blow stick mount 30 actuated by a blow stick cylinder 32. A powder spray gun 34 is mounted inside the blow stick 28 and mount 30, which are provided with a vent or exhaust port 36. The spray gun 34 is raised or lowered by a hydraulic cylinder 38 inside the bottle independently of the blow stick movement.

A flexible hose 41 to the powder spray gun 34 leads from a powder meter-injector unit comprising a trapper 40, which supplies powder to a vibratory feeder 42. The feeder 42 delivers the powder to a screened funnel inlet 44 to a meter cylinder 46 having a piston driven by a cylinder 48. The powder meter-injector unit serves to meter the proper size charge of powder coating material using a vibrating type feeder and then inject the powder into an air stream to carry the powder to the spray gun and into the bottle at the precise moment.

The in line coating process is integrated into the conventional blow molding process so that the operations can be carried out almost simultaneously. The parison P is extruded and the blow stick 30 raised so that the parison P will drop over it. Then the molds 32 are closed and clamped over the parison and blow stick. The vent or exhaust 36 is opened and the powder coating blown from the powder meter-injector 40 through the powder spray gun 34 and into the bottle. As the powder is being sprayed, the powder spray gun 34 is made to traverse up and down inside the bottle so that the powder coating will hit the entire internal surface of the bottle.

The vent is allowed to remain open for the duration of the spray phase of the cycle to permit continuous circulation of the spray air which carries the powder coating into the bottle. If there were no vent or drain, only a small quantity of air and consequently very little powder coating could be blown into the bottle. The bottle would fill with air and stop the flow. When the powder coating strikes the surface of the hot polyethylene, the powder melts and begins to flow. At this point, approximately 5–10 seconds after the molds have been closed, the vent is closed and the blowing air turned on forming the coated clamped parison into a bottle within the mold.

It is important to form the bottle while the coating is still able to flow and before it has gelled. This permits the coating to "blow" with the parison. The blowing air is kept on until just before opening the molds. Before the molds are opened, however, the blow stick is lowered freeing the coated bottle from it and then the molds are opened some 20–30 seconds after initially closing the mold. A complete blow molded coated bottle is removed from the machine.

In the process of blowing the powder coating into the parison, the spray air 40–60 p.s.i. actually blows the parison into the bottle mold cavities and, to prevent this already formed bottle from collapsing, the blow air is started just before the spray air is stopped. The overlap is slight (one second) then the vent is closed allowing the blowing air 80 p.s.i. to exert its full force to form the bottle.

The entire in line coating process is carried out automatically using electric solenoid actuated valves to control the blow stick movement; the powder spray; the powder spray gun movement; the venting; the blow air through a point multiflex timer. The timer is used to program the sequence of all of the functions of the in line coating cycle.

What is claimed is:

1. In line method of inside coating during molding which comprises extruding a parison, lowering said parison over a blowstick, closing and clamping molds over said parison and blowstick, opening a vent from said mold, blowing a barrier coating material from a meter injector through a spray gun inside said blowstick into said parison, traversing said spray gun up and down inside said parison, closing said vent, turning on blowing air through said blowstick, forming the cooled clamped parison into a container product within the mold, and lowering said spray gun and blowstick to free the coated container product therefrom.

2. The method of claim 1 wherein a powder barrier coating material is blown into said parison.

References Cited by the Examiner
UNITED STATES PATENTS 2,285,370  6/1942  Staelin _____ 264—309 XR
3,217,071  11/1965  Plymale et al. _____ 264—98

ROBERT F. WHITE, *Primary Examiner.*

A. R. NOE, *Assistant Examiner.*